UNITED STATES PATENT OFFICE.

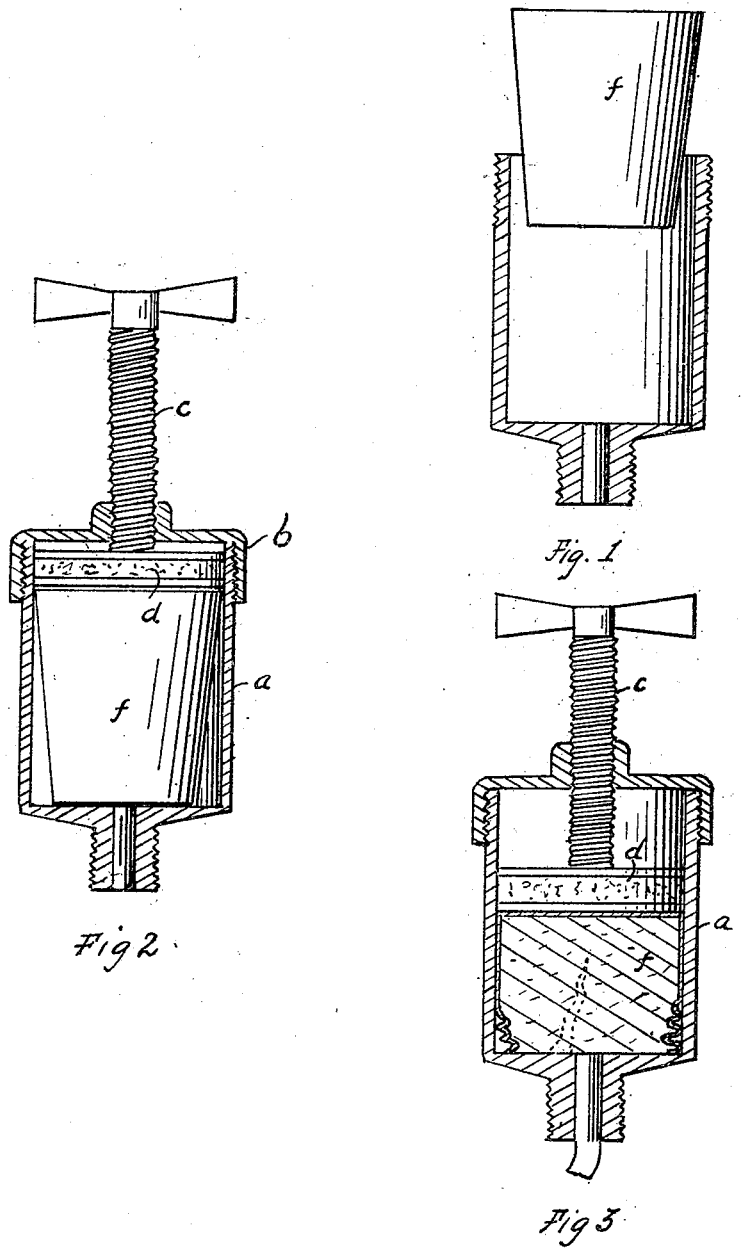

FRANK FORSHEE, OF FLINT, MICHIGAN, ASSIGNOR, BY MESNE ASSIGNMENTS, TO COPEMAN DEVELOPMENT COMPANY, OF FLINT, MICHIGAN, A CORPORATION OF MICHIGAN.

GREASE-CUP.

1,314,073.

Specification of Letters Patent. Patented Aug. 26, 1919.

Application filed April 8, 1918. Serial No. 227,189.

*To all whom it may concern:*

Be it known that I, FRANK FORSHEE, a citizen of the United States, residing at Flint, in the county of Genesee and State of Michigan, have invented a new and useful Improvement in Grease-Cups, of which the following is a specification.

This invention relates to grease cups and grease capsules for use in lubricating systems, especially for automobiles. It has for its object an arrangement of capsule and grease cup so that the grease capsule may be placed in the grease cup with great facility and yet will fit the grease cup, so that it will avoid the grease being driven back of the capsule against the plunger.

In the drawings,—

Figure 1 is a longitudinal section of the grease cup showing the grease capsule being placed in position.

Fig. 2 is a similar view showing the grease cup cap and plunger in position.

Fig. 3 is a similar view showing the plunger driven part way into the cup and the capsule partially collapsed.

Grease capsules have been used heretofore in connection with grease cups so that grease may be prepared in the capsules and sold to the trade in this form, thereby eliminating the necessity of soiling the fingers in filling grease cups with grease. However, it is almost necessary to have a grease capsule that will nicely fit the grease cup. Otherwise the grease will drive back against the plunger instead of being first driven out through the orifice in the grease cup. This, of course, is undesirable as it gets the plunger all greasy and the cap greasy and one is liable to soil his fingers on this. Furthermore, the grease might get past the plunger if the plunger did not have an absolutely tight fit with the walls of the grease cup. However, the tight-fitting capsules are very hard to place in the grease cup for they are made of material that does not remain truly cylindrical and tends to assume an oval cross section, and too, they are very often damaged and it is often almost impossible to get them into the grease cups. It is to obviate this difficulty and inconvenience and at the same time get all the advantages of a tight-fitting capsule in the way of preventing the escape of grease backward against the plunger, that this invention is designed.

*a* is the customary grease cup; *b* the customary cap that screws on the top of the cup; *c* the screw stem, and *d* the plunger. *f* is a capsule in the form of the frustum of a cone.

Referring to Fig. 1, it will be seen that the capsule may be easily inserted notwithstanding the fact that in cross section it may have assumed somewhat of an oval shape, the smaller end giving plenty of clearance between the capsule and the walls of the cup, and it may be forced down into the grease cup although the top of the capsule may have become damaged or slightly oval, for obviously a portion of the capsule having gone into the cup, this will act to draw the rest of the capsule in when guided by the walls of the cup.

When the capsule is in place, it will have the appearance as shown in Fig. 2, in which the top of the capsule just nicely fits into the cylindrical chamber of the cup. As the plunger is pressed against the capsule in the initial stages of the collapsing of the capsule, it is quite likely that the walls of the capsule will be ruptured as shown in Fig. 3 due to the fact that the conical form gives considerable space between the walls of the capsule and the walls of the cup. This will drive the material out of which the capsule is made tightly up against the walls of the cup near the top of the capsule, while the bottom of the capsule will fold over in sort of an accordion-like arrangement. This insures the stock out of which the capsule is made forming an efficient barrier to prevent the grease from escaping back against the plunger.

It is, therefore, apparent that not only does the frusto-conical shape of the capsule make it very easy to insert the capsule in the cup and fit it into the cup, but this frusto-conical shape results in an initial rupture of the capsule which makes the stock at the top of the capsule act as a packing to prevent the escape of the grease behind the capsule.

Of course, the principle of this capsule could be realized without getting an absolutely true frusto-conical shape, but such forms would clearly come within the principles of my invention.

What I claim is:

1. A grease cup, having in combination, a barrel provided with a cap, a plunger and screw stem passing through the cap, and a frusto-conical collapsible grease capsule whose base is substantially the diameter of the barrel, whereby clearance is allowed for the insertion of the smaller end in the barrel and the larger end fits tightly in the barrel to act as a packing to prevent the escape of the grease behind the capsule.

2. A grease cup, having in combination, a barrel provided with an outlet orifice, a frusto-conical collapsible grease capsule having its smaller end open and its larger end closed, the capsule being insertible in the open end of the barrel open end first and having the diameter of the large end of the capsule substantially that of the barrel to provide a tight fit, and means bearing on the large end of the capsule for collapsing the same.

In witness whereof I have hereunto set my hand on the 1st day of April, 1918.

FRANK FORSHEE.